Dec. 23, 1930. M. W. ARROWOOD Re. 17,908
FURNACE AND METHOD OF BURNING FUEL
Original Filed Aug. 8, 1921
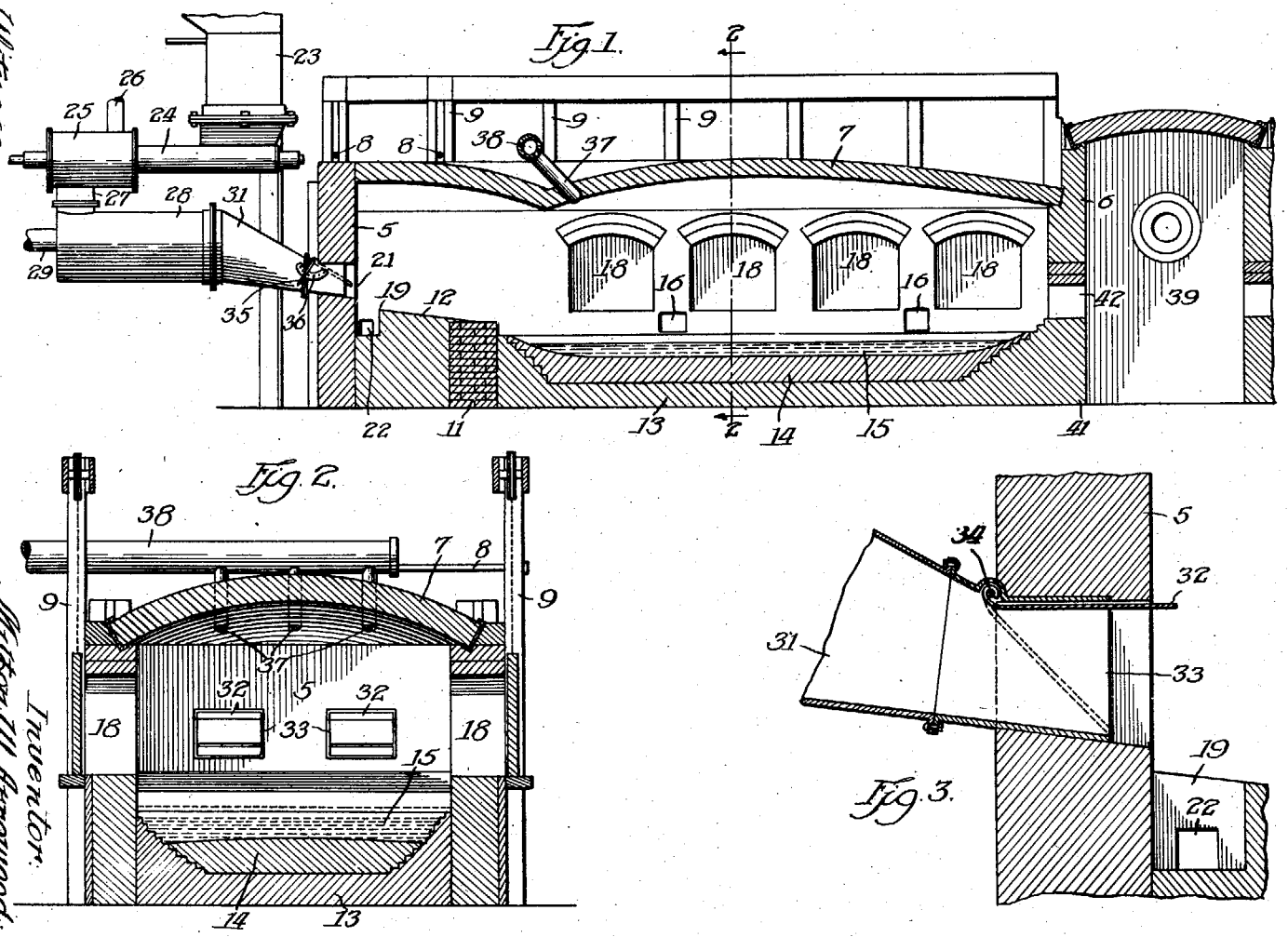
Witness:
R. B. Davison.
Inventor:
Milton W. Arrowood.
By: Ira J. Wilson
Atty.

Reissued Dec. 23, 1930 Re. 17,908

UNITED STATES PATENT OFFICE

MILTON W. ARROWOOD, OF GREENWICH, CONNECTICUT, ASSIGNOR TO UNIVERSAL ENGINEERS, INC., OF WORCESTER, MASSACHUSETTS, A CORPORATION

FURNACE AND METHOD OF BURNING FUEL

Original No. 1,617,510, dated February 15, 1927, Serial No. 490,529, filed August 8, 1921. Application for reissue filed February 14, 1929. Serial No. 339,964.

This invention relates in general to a method of and means for burning fuel, operating furnaces, and treating metals in furnaces, and while I have shown it in the present drawings as embodied in one of the preferred forms in a melting furnace, it should be understood that the principles thereof are capable of embodiment in furnaces used for other purposes, such as annealing or heating furnaces, or furnaces as used for smelting metals for instance.

My present invention may naturally be used in all that general class of furnaces where the conditions are less exacting than in the treatment of metals, in fact, the invention is not only desirable, but a real necessity in any furnace for whatever purpose, where comminuted, pulverized, atomized, or diffused fuels are burned in free suspension. It is obviously not feasible, and is not considered necessary, to illustrate all possible types of such furnaces where my invention is useful and necessary for efficiency.

It should be observed that while the invention herein relates, in general, to a method and means for treating metals in furnaces, it is nevertheless true that certain of the features of my invention, as herein disclosed, particularly as relating to the regulation of the total quantity and of relative proportions of fuel and air, and the even diffusion of the fuel throughout the air, and also as to the regulation of the static pressure and draft in the furnaces, apply equally well to furnaces in general, irrespective of whether the furnace at the time may be used for treating metals. These features are, in fact, vital to the proper regulation and control of furnaces when firing comminuted, pulverized, atomized, or diffused fuel, all of which may be fired and burned in free suspension.

My invention relates to the control of firing and burning of any fuel fired into the furnaces. The regulatory features of my invention, as herein disclosed, have not been understood as applied to fuels burned in a finely divided and diffused state in free suspension. My invention relates particularly to the method and means of establishing and maintaining accurate control, under all desired operating conditions with all such fuels, when burned, either severally or collectively with two or more said fuels in an evenly diffused condition in free suspension in combination with the correctly proportioned combustion air delivered to the combustion chamber with the said fuel or fuels as an evenly diffused combustible mixture.

Both the quantity and relative proportions, as well as the evenness of diffusion of the fuel or fuels throughout the combustible are at all times under definite control when fed to furnaces, either severally or collectively, on the improved method herein outlined, and it is this method of securing and maintaining definite control of all the firing and burning conditions which is the essence of my present invention. When the total quantities of fuel or fuels and air, as well as the relative proportions of the same, and the diffusion of the fuel or fuels throughout the air volume are regulated and controlled as in my present invention, the various operating conditions of the furnace are also brought under control, with the result that my invention brings about a great improvement in the burning of all fuels in the state of a diffused mixture in free suspension.

My present invention brings about a marked increase in the efficiency of such firing operations where comminuted, pulverized, atomized, or diffused fuels are fed and burned in free suspension within the said furnaces. For example, the total quantity of combustion gases produced under close regulation and, hence, the velocity of flow through the furnace, is likewise closely controlled. All of this, it is readily understod, is a distinct advantage in the operation of furnaces burning diffused fuel mixtures in free suspension, as herein described.

Prior to my invention these principles have not heretofore been at all understood in connection with furnaces using such fuels burned in free suspension in the treatment of metals and, in fact, these correct principles, which are the essence of my present invention, have not previously been understood or applied in any form of furnace, formerly used and fired with fuels burned in free suspension, either for metallurgical or other purposes. Owing to the intense heating conditions required in the treatment of metals and the necessity for relatively high temperatures, as well as the restrictions to particular types of furnace construction customarily used in the metals industries, it has not been possible heretofore successfully to treat metals with these fuels fired and burned in free suspension. One purpose of my invention, therefore, is to make possible the efficient treatment of metals when fired with such fuels by establishing the aforementioned control conditions which make possible efficient combustion and application of the resulting heat to the metals being treated.

Without these control conditions it would be impossible to secure the desired temperatures in the furnace, in view of the large amount of heat lost up the stacks, except by the consumption of a prohibitive amount of fuel.

It will be recognized that these principles operating so effectively under the exacting conditions existing in the metals industries will be equally effective in the operation of furnaces in general where it is desired to fire such comminuted, pulverized, atomized, or diffused fuel, or fuels, severally or two or more collectively, to furnaces. In other lines of activity operating conditions are not so exacting, and there is no limitation as to the necessity of maintaining temperatures on the order of the maximum possible temperatures obtainable from fuel combustion. Formerly, others have been able to operate such furnaces with steam generating equipment and for other similarly less exacting industrial applications by resorting to specially designed furnaces at considerable sacrifice in first cost, and, in many cases, also a material sacrifice in the efficiency of combustion and heat application.

It has previously been the necessary custom in general for the operators of such furnaces to rely upon special and elaborate furnace designs and, in most cases, they have had to employ furnaces of unusually large dimensions. One of the primary purposes of the present invention is to avoid the necessity of using such special and large cumbersome furnaces and, in fact, to bring the firing and operating conditions under such close regulation and control that fuels, whether comminuted, pulverized, atomized, or in the gaseous forms, may be readily and efficiently fired, severally or two or more fired collectively, and burned in free suspension, irrespective of the particular form or construction of the given furnace. In other words, it is the purpose of the present invention to make the firing of all the hereinbefore described fuels or any fuels burned in free suspension, independent of particular or special furnace construction, relying solely upon the herein disclosed regulation control of the firing and furnace conditions to secure the desired results, that is complete combustion of the fuel, or fuels, under the conditions most favorable for utilizing the liberated heat most efficiently.

In certain kinds of furnaces of this general character, and particularly in melting furnaces, it has been customary heretofore to provide a hearth which is sloped to a depressed point where the tap hole is located. As the result of this shape of hearth, the solid charge of pig iron and scrap iron which is piled upon the bottom of the hearth for melting purposes, is concentrated over the depressed portion of the hearth where it assumes considerable depth, forming a barrier for the flame of burning fuel. It follows therefore that the flame cannot penetrate to any considerable distance into the base of the charge and becomes concentrated to a large degree upon and against the forward portion of the charge, while the remaining portions are subjected to very little heat. The result is that the melting of the charge takes place very slowly and requires the expenditure of a great amount of fuel. Furthermore, the molten metal forms a deep pool in the depressed portion, the bottom of which tends to become cooled so that in practice, it becomes necessary to run the furnace for a considerable period after the metal is all melted before it is all heated sufficiently for pouring purposes.

One of the primary purposes of my present invention as relating particularly to melting furnaces is to provide a furnace, the hearth of which will be substantially level from end to end and devoid of depressions so as to provide a relatively shallow bath of substantially uniform depth. This construction permits of a more even distribution of the solid charge over the area of the hearth, with the result that a large area of the charge is exposed to the action of the flames, thus materially facilitating and expediting the melting of the charge and reducing the amount of fuel required for the melting. Manifestly, the molten metal in a shallow bath having a large top surface exposed to the heat in the furnace can be thoroughly heated much more expeditiously than the same quantity of metal in a deep pool. Consequently, with my improved shallow bath furnace, the pouring may be begun soon after the actual melting has been completed, thereby effecting a material economy both in time and in fuel.

To insure the flow of the molten metal from the hearth through the tap holes, the hearth is preferably slightly inclined transversely either from one side to the other, or preferably as herein shown, is slightly arched transversely so that the molten metal will flow to both sides thereof, where it may be withdrawn through tap holes at each side of the furnace.

In furnaces of this character it has heretofore been customary to maintain a strong draft from the melting chamber through the outlet stack by which a vast part of the heat units generated by fuel supplied to the furnace are carried away and dissipated.

My invention contemplates the delivery of the fuel or fuels, severally or two or more collectively in a comminuted, pulverized, atomized, or diffused form mixed with air, to the furnace in controlled proportions at low velocity and under low pressure, and the communicating opening between the furnace and the stack is so located and so proportioned with respect to the fuel pressure and the size of the stack is so proportioned that the furnace chamber is usually maintained under a slight static pressure and the products of combustion leave the chamber and are delivered from the stack at a low velocity. Instead therefore of drawing enormous quantities of heat up the stack, the fuel is practically completely consumed in the furnace chamber so that its heat units become effective upon the charge to be heated or melted and a minimum of heat is lost through the stack, thereby greatly increasing the efficiency of the furnace. This draft control is equally desirable in the operation of furnaces in general, whether or not the furnaces may be used for the treatment of metals. The stack and the draft opening between the furnace and the stack are so designed as to favor a slight static pressure in the furnace, but by varying the fuel delivery pressure, this static pressure may be changed to a substantially balanced draft or to an appreciable outlet draft if desired. My invention therefore provides for a wide range of flexibility in its operation to successfully meet various conditions to which it may be subjected.

Another feature of my invention resides in the provision of means for delivering the comminuted, pulverized, atomized, or diffused fuel or fuels mixed with air and evenly diffused throughout the air to the furnace in a turbulent condition, so that it or they swirl as a mass of slow moving mixture over the surface of the charge so as to more readily distribute its heat thereto. The effectiveness of the burning mixture is further increased in the case of melting furnaces by delivering it downwardly or in a downwardly inclined direction from the nozzle against the bath which results in a penetration of the flame into the mass of loosely piled material forming the charge on the hearth, thereby causing the flame to continue along the hearth at the base of the charge while the charge is in solid state, and also causing it to impinge against the adjacent margin of the bath when melted, thus producing a most effective heating action.

Another object of this invention is to insure that the fuel, whether comminuted, pulverized, atomized, or diffused, is delivered to the furnace in a completely atomized diffused condition, being evenly distributed throughout all of the necessary combustion air and the entire diffused mixture of the comminuted, pulverized, atomized, or diffused fuel or fuels, severally or two or more collectively, being delivered in a swirling turbulent condition to the furnace; while at the same time complete control is maintained of the quantity and relative proportions of the fuel and air as well as control of the static pressure and other furnace operating conditions herein described. It should be particularly noted that the essential nature of the novelty of the invention in this patent is the maintaining of a definite control of all factors relating both to the firing and chemical control of the gaseous and slag deposits in the furnace. This includes not only the control of the quantities of fuel or fuels, together with the control of the quantity of air, but also includes the governing of velocity and static pressure in the furnace as well as the chemical control of the ingredients in the burning mixture or mixtures which, in turn, gives control of the chemical ingredients in the finished product; provided, of course, that the initial quantities of the desired ingredients in the product are proportioned properly when making up the raw batch of material going into the furnace.

While it is apparent that the chemical control of metals is a desirable and novel feature resulting from the accurate control of the quantity and relative proportions of fuel and air, it should not be understood that it is the purpose to limit this invention to metallurgical processes alone. The desirable gas conditions established by accurate control of the quantity and relative proportions of comminuted, pulverized, atomized, or diffused fuel or fuels, and combustion air delivered in turbulent condition at low velocity are fully as effective in many other industrial applications as they are in metallurgical furnaces. It is obvious that such regulation is highly desirable in any furnace as tending to conserve the total quantity of heat and control the rate of heat liberation so as to secure maximum efficiency.

A further object of my invention is to provide a furnace in which the front bridge wall is spaced a limited distance from the front wall of the furnace chamber, the forward end of the hearth between these walls being provided with a masonry floor inclined downwardly from the front wall to the bridge wall so that any slag deposited on this portion of the hearth will drain freely into the bath. In order however to relieve the bath from an accumulation of as much slag as possible, this floor is provided adjacent the front wall and immediately beneath the point of delivery of the fuel into the furnace with a depressed pocket. Since the fuel is delivered at low velocity, the flame formation occurs near the front wall and that slag which results from the initial flame formation drops immediately into this pocket from which it may be removed at intervals through cleaning doors communicating with the pocket. This construction eliminates to a large extent that portion of the slag which is particularly injurious to the brick work of the bath and thereby materially reduces the cutting in of the side walls of the furnace at the slag line which has heretofore been a principal cause of brick repairs. The corrosive action upon the brick walls is further reduced by the fact that the combustion in my improved furnace is rapid and complete instead of progressive throughout the length of the furnace, thereby causing an improved gas condition within the furnace which diminishes the deteriorative effects upon the brick work and reduces the chemical activity of the bath slag upon the furnace walls.

Another and important feature of my invention resides in the fact that where the proportions of the several ingredients of a charge are substantially correct, by mixing with the comminuted, pulverized, atomized, or diffused fuel or fuels just sufficient air to support complete combustion, or, in other words, providing a neutral flame; by delivering this mixture at low velocity into the furnace so that the combustion is speedy and complete; by directing the burning mixture downwardly against the bath; and by controlling the pressure within the furnace, an extremely high, intense and penetrating heat is produced, which quickly melts the charge without burning out as large a percentage of the silicon and manganese as has heretofore been burnt out with other methods of firing. The result is that the furnace charge may contain a much larger proportion of cheap scrap metal and a correspondingly less amount of expensive pig iron than customary, thereby reducing the cost of the charge while still producing malleable metal of the desired composition.

The control of the combustion conditions which may be done so as to produce a neutral or oxidizing, or a reducing flame, as desired, is obviously a vital factor in the operation of all furnaces in general where a fuel or fuels are to be burned in free suspension, as herein described. Even in the case of furnaces under boilers or steam generators, for example, these control features are still of vital importance, as they make possible the most efficient combustion of the fuel, and tend to protect and conserve the furnace linings and heating surfaces.

And it obviously follows as a corollary of the matter of the foregoing paragraphs that regulation of the relative proportions of fuel and air admitted through the burners will vary the character of the flame which may thereby be modulated to meet the requirements of the charge. For instance, if the proportions of the carbon and silicon, manganese and sulphur constituents be too high, the proportion of air in relation to the fuel may be increased to produce an oxidizing flame. On the other hand, by decreasing the proportion of air a reducing flame can be secured, while, as above, if the batch is properly proportioned, as it should be, a neutral flame is used which will neither reduce nor increase the relative proportions of the charge ingredients.

Still another object of the invention is the provision of means whereby the direction of discharge of the fuel mixture into the furnace may be regulated and controlled so that it may be directed downwardly upon the masonry floor in front of the bridge wall, or may be directed over the bridge wall into the forward end of the bath, or may be directed toward a point in the bath more remote from its front end, as desired, thus providing for flexibility in the furnace operation so that it may be accommodated to various requirements and rendered highly efficient under all conditions.

It will be seen that this flexibility in controlling not only the chemical character, but the direction in which the flame is projected into the furnace, is desirable in furnaces in general, where, for example, it may be necessary or advisable to deflect the flame in a downward or otherwise specified direction in order to avoid impingement against refractory walls, radiant heat superheaters, or for other necessary and sufficient reasons.

While in many cases it is desirable to point the flame in a downward direction and to control the angularity of discharge with reference to the horizontal axis of the furnace, it should be understood that the numerous other desirable features of my present invention, and the inherent advantages of its operation are not to be limited solely to the downward projection of the flame. It is obvious that all those features of the invention relating to the control of the total quantity and relative proportions of fuel and air and the resulting control of the chemical condition of the gases in the furnace are present in the operation of my improved furnace, irrespective of the angularity at which the flame is discharged. These and other similar advantages, therefore, are not to be in any sense restricted to the use of a flame discharged at a downward angle.

On the other hand, it is equally obvious that in many operations and especially in the melting of malleable iron, and also to some extent in the smelting of metals the downward direction of the flame and its impingement on the bath must necessarily involve decided operating advantages which are equally as essential parts of my present invention as is the other chain of advantages relating to and hinging about the control of the quantity and relative proportions of fuel and air and, hence, the chemistry control and gas velocity control of the furnace.

It will be observed that one class of improvements in the present invention relates and is applicable to all that class of furnaces in general wherein the specified control conditions as to quantity, proportions, chemical constituents of the gases, velocity and controlled draft pressure are always of necessity present when and wherever there is employed a burner capable of delivering a completely and evenly diffused mixture in a turbulent condition at relatively low velocity, and in all respects under complete control, such as is had when using one of the preferred forms of burners illustrated and described herein. While the preferred burners, as illustrated, are entirely capable of establishing the conditions precedent to the successful working of this invention, it is entirely possible that burners of other types may also be capable of establishing the necessary conditions of turbulent firing under control, as herein described. It is not desired, therefore, to restrict the invention to any particular burner structure, but it should be understood that any burner or feed device capable of establishing the conditions of operation as described may be satisfactorily employed in carrying out the improved method of furnace operation as embodied in the present invention.

Another class of advantages of the present invention relates more particularly to the control of chemical ingredients in the metal or metals where same are being melted or where ores are being smelted in order to produce metals. It is readily seen that the herein described advantages resulting from the condition wherein the chemistry of the furnaces is at all times under accurate control, both as to the combustion gases and the slag or ash produced, while reacting variously in different types of furnaces, nevertheless at all times make possible a definite improvement in operation. As pointed out elsewhere, one improved result has to do with the avoiding of rapid deterioration on the refractories. This result, of course, is equally desirable in any and all types of furnaces, part of the containing walls of which consist of refractories and this, in effect, means practically all furnaces, inasmuch as few, if any, furnaces or combustion chambers are properly constructed without the use of refractories, at least to some extent.

Another manner in which the advantages inherent in complete chemical control of operations are made manifest is in the control of chemical ingredients necessarily required in certain metals when melted or smelted in order to produce the desired character of product. Again, for example, in the case of steam boilers this same desirable complete chemical control of gases and slag formation manifests its decided advantage in such matters as coating the surfaces of refractories with a glazed covering which protects the refractory walls against the intense flame of the furnace and, hence, results in a decided operating economy.

Still another manifestation of the advantage of the present invention, as embodied in chemical control, is found in the fact that low grade fuels frequently containing considerable percentages of sulphur can be burned with immunity when the methods and means constituting the present invention are brought into play. Thus, for example, the sulphur is so completely and instanteously burned that the usual deleterious effects experienced on heating surfaces and uptakes of the boilers are almost entirely eliminated. It is manifestly impracticable to catalogue all of the operating advantages resulting from the decided improvements of method involved in the present invention, but it is believed that these examples sufficiently illustrate the very decided improvement in operation that is possible where full chemical control is established. It should be understood that such control is only possible where the feeding devices are of such design and are so operated in conjunction with the furnace form and draft regulation as to bring about, through the combined operation of a suitable burner and furnace, the conditions of velocity, draft, and chemical control herein described.

Other objects and many of the inherent advantages of my invention should be readily appreciated as the same becomes better understood by reference to the following description, when considered in connection with the accompanying drawings.

Referring to the drawings:

Fig. 1 is a longitudinal sectional view through a furnace embodying my invention;

Fig. 2 is a transverse sectional view through the line 2—2 of Fig. 1; and

Fig. 3 is an enlarged sectional view through the delivery end of the mixer burner;

Referring now to the drawings more in detail, it will be observed that my improved furnace comprises an enlongated chamber uninterrupted from end to end but comprising two portions, namely: the rear portion in which the material to be heated is placed, and which may be considered as a heating chamber, and the forward portion where initial combustion of the fuel begins and is practically completed and which may be considered as a combustion chamber. The furnace chamber as a whole comprises the front wall 5, rear wall 6, and the roof 7, all of which are constructed of fire brick in a well known or preferred manner and bound together by suitable tie rods 8 cooperating with buck stays 9.

The bottom of the chamber is provided with a bridge wall 11 extending upwardly into the chamber a limited distance, this bridge wall being spaced a limited distance from the front wall 5 and the space between these walls being filled in and provided with a masonry floor 12 which is inclined downwardly from its front edge to the top of the bridge wall. The foundation 13 of the furnace disposed rearwardly of this bridge wall may be of suitable construction suitably covered in annealing or other heating furnaces, but for melting furnaces, such as I have herein illustrated, this foundation is covered by a sand bed 14 forming the hearth which is substantially level from end to end instead of having a deep depression between its ends, as has heretofore been customary. This bed is adapted to accommodate a bath 15 of molten metal which is relatively shallow and of substantially equal depth from end to end, although in practice the rear portion is slightly sloped from rear to front for a considerable distance to facilitate flow of metal to the tap openings and to decrease the depth of the bath toward the rear of the furnace where the heat is less high. This substantially level hearth permits a substantially even distribution of the solid charge over the area of the hearth and consequently the melting flame, instead of encountering a deep barrier to the bottom of which it would be unable to penetrate, is caused to impinge against a large area and to penetrate the charge of loosely piled solid material and swirl along the bottom of the charge so as to most effectively deliver its heat units to the charge and reduce the melting time to a minimum. In practice the material will be piled somewhat higher at the front end of the pile than it is in the rear of the chamber so that a larger quantity will be subjected to the maximum heat near the forward end of the hearth. The decrease in depth of the bath toward the rear end corresponds approximately to the decrease in temperature and pressure of the products of combustion as they approach the rear end of the chamber. Because of the reduced scale of the drawings, this decrease of bath depth is scarcely apparent in Fig. 1.

For the purpose of holding the hot products of combustion down against the bath, the roof 7 is inclined downwardly toward its rear end, and furthermore, the outlet opening from the furnace to the stack and also the top of the rear bridge wall are disposed only slightly above the level of the bath. The entire structure therefore, is conducive to the most complete transference of heat from the products of combustion to the bath and to a high degree of furnace efficiency.

In order to facilitate the withdrawal of the molten metal from the bath, the floor 14 thereof is preferably slightly convex in transverse cross section, as will be apparent from Fig. 2. This upward arching of the floor is adapted to cause the metal to flow to the sides of the bath from which it may be drawn off through one or more tap holes 16 located at each side of the furnace. Should it be preferable to draw the entire charge from one side of the furnace, the bath floor, instead of being transversely arched, may be slightly inclined from one side to the other so as to deliver the molten metal to one side of the furnace.

The furnace may be charged through doors or openings formed in the side wall or through the roof, which may be equipped with removable bungs, as is customary in reverberatory furnaces. In this instance, I have shown for purposes of illustration, the side wall provided with a plurality of charging doors 18, such as are customarily employed in open hearth furnaces and through which the pig and scrap iron and other ingredients of the charge may be introduced into the chamber and distributed over the hearth.

In certain smelting furnaces it is necessary to control the temperature within rather narrowly restricted limits, and also the character of gases must be under control of the operator, as otherwise with excess temperature and perhaps, at the same time an excess of oxygen in the gases, there will be a large loss of metal by oxidization and under certain conditions the smelting action, or melting of the metal from the ore may be greatly impeded, due to the possible excess formation of slag and lack of fluidity in same.

Then again, in the case of smelting certain metals, a relatively slight increase of temperature may, as in the case of zinc, for example, cause a vaporization of the metal and a very large loss by waste due to such vaporized metal escaping with the stack gases. It is believed that without further explanation or illustration sufficient has been stated to make plain the fact that very close control is necessary in all smelting furnace operations, so that the improved features of my present invention are most practicable to all such furnaces, and indeed may be said to be almost a prerequisite to successful and economical operation.

Where the furnace is used merely for heating ingots or bundles of metal, as in the furnace commonly known as "pile and board furnace", the wall may be eliminated and, if desired, the floor may be made practically level. This floor may be constructed of special refractory sand, as in the case of the melting furnaces or other convenient refractories may be used, if desired. In case the floor is made level, it will be necessary to clean out the slag accumulation at periodic intervals. It is, therefore, generally preferable to slightly incline the floor in these heating furnaces in the manner already explained for melting furnaces in order that the slag may flow along the incline to the tap holes, which may be located on one or both sides of the furnace in the same manner as for the melting furnaces. One of the distinct advantages of my invention in this respect lies in the fact that the flame produced under the conditions of control embodied in the present invention is of such character and intensity as makes possible the formation of high oxide slag compounds, which are more fluid than the low oxide compounds generally formed under less favorable conditions and, hence, it is possible to remove the bulk of the slag from the furnace floor through the tap holes. In the previous operation there has always been considerable difficulty owing to the stiff nature of the low oxide slags, and the temperature and chemical conditions set up in carrying out my present invention overcome this serious operating condition. It will be seen, therefore, that the construction, as illustrated in Figures 1 to 3, is entirely suitable for all such heating or reheating furnaces, but it will readily be seen that the improved principles of my invention may likewise be applied in furnaces having various modifications from the structure illustrated, and it is not the intention to restrict the method of this invention to the particular structure.

Where it is desired to anneal metals directly, as in the heat treatment of billets, rods, sheets, plates, etc., the furnace as shown is entirely suitable, but again the principles of my invention are broadly capable of being embodied in furnaces of modified structure.

If the metals that are to be subjected to annealing treatment are packed in large metal pots, as is commonly done in the case of tin plates, and/or malleable castings, the furnace as illustrated in Figures 1 to 3 may still be employed, but as a matter of convenience in charging the furnace a modified construction is preferred. Special charging machines capable of carrying large pots full of material are most conveniently placed in these ovens where the entire end consists of removable doors.

Referring again to the melting operation, it will be observed from Fig. 1 that the level of the bath is below the top of the masonry floor 12 and the upper edge of the bridge wall, so that any slag which is deposited on this floor above the level of the bath will drain freely into the bath. Adjacent with a front wall 5 the floor 12 is provided with a pocket 19 disposed immediately beneath the delivery openings 21 through which the ground coal mixed with air is delivered into the furnace. The mixture being delivered at low velocity, the ignition begins immediately upon its entrance into the furnace, and since a large proportion of the slag formed, and particularly that portion which is most injurious to the brickwork of the furnace is produced at the point of flame formation, it will be apparent that this slag will drop directly into the pocket 19 where it is collected and procluded from entering the bath. I have found that the separation of the slag produced at the point of flame formation of the fuel mixture, and the elimination of this portion from the bath coupled with the speedy and complete combustion of the fuel which improves the gas condition in the furnace changes the chemical character of the bath slag as well as reduces its quantity, with the result that the corrosion of the brick work at the slag line is materially reduced, thereby diminishing the necessity for repairs to the furnace. The slag collected in the pocket 19 may be cleaned out at intervals through cleaning doors 22 located in the side walls of the furnace at each end of the pocket. With controlled combustion conditions as embodied in this invention the quantity, character and chemical composition of the combustion gases is maintained practically constant on a given furnace. Since combustion is complete and the resulting gases are inert the chemical conditions in the gases are highly favorable to avoiding contamination or injury to the product or to the furnace walls or to the heating surfaces, as in steam boilers, or to the metal surfaces of pots, as in annealing processes. In previous practice there has always been considerable loss or damage in these various directions, due to irregular operation and also due to varying temperatures and varying chemical conditions in the gases and slag on the surfaces of refractories, and especially in many cases due to excess oxygen owing to unbalanced combustion conditions. This oxygen not only combines or burns out a considerable part of the metal, but is also an active agent which, it may be said, is seeking to destroy whatever chemical elements it may encounter, and in the smelting of metals, for example, the oxidizing of metals may even be a more serious loss than that encountered in the above described melting operations. Without further explanation, it is believed that the attainment of complete chemical control of gases and slag conditions in the furnace as established in my present invention is of the greatest importance.

I have shown in the present installation somewhat diagrammatically, a preferred type of burner mixer, the general construction of which is disclosed in U. S. Patent No. 1,355,444, granted October 12, 1920, and the preferred specific construction in my copending application, Serial No. 299,833, filed May 26, 1919, now Patent No. 1,474,613. In this type of burner, the powdered coal is delivered from a hopper 23 through a worm screw casing into a mixing cylinder 25 to which air under pressure is delivered through a supply pipe 26. The fuel under pressure mixed with air is then conducted through a connection 27 to the mixer proper 28 to which additional air under pressure is supplied through a pipe 29.

After being thoroughly mixed with air in this mixer, the fuel is delivered through a tapered downwardly inclined conduit 31 into the forward end of the furnace chamber. The shape of this conduit causes the mixture of fuel and air to be delivered in a turbulent, swirling condition and since the mixer is of the low velocity type, this turbulent supply of fuel continues after ignition in a swirling mass through the furnace in a condition which is most favorable to the transference of its heat to the charge in the furnace.

It will be noted that the delivery of the combustible mixture is in a downwardly oblique direction, but the vertical direction of discharge may be varied and controlled by means of a controlling plate or damper 32 located in the nozzle 33 of the burner. This controlling plate, which may be made of sheet iron or suitable material, is pivotally supported upon a transverse bearing rod 34 which may be equipped at one end with a handle 35 or other means by which the position of the plate may be adjusted to any point intermediate the full open position shown in full lines in Fig. 3 and the full closed position shown in dotted lines in said figure. Any intermediate position between the two positions shown will vary the direction of discharge of the combustible mixture so that it may be diverted downwardly upon the floor 12 or over the edge of the bridge wall into the bath or into the bath at a point more remote from the bridge wall depending on the position of the plate which is, of course, adjusted to meet the requirements of the charge and the condition under which the furnace is being used. For purposes of holding the plate in any adjusted position, I have provided a sector member 36 having provisions for cooperatively engaging the handle 35 to hold it in any adjusted position.

While one or a series of burners for supplying fuel to the furnace may be employed, depending on the size of the furnace and the size of the burners, I have shown in the present instance, as will be apparent from Fig. 2, two burners having their delivery nozzles 33 located in spaced relation in the front wall 5.

The manipulation of the plate 32 will in most instances be sufficient to cause the delivery of the fuel at the requisite point in the bath, and the sloping top wall 7, together with the location and size of the outlet opening and the proper proportion of the stack and proper regulation of the fuel pressure causes the flame to hug the bath closely throughout its length to most effectively heat the bath. In some instances, however, it may be preferable to employ a top blast to augment the downward delivery of the flame and I have therefore made provision in my improvement for the employment of such a blast when required. With this end in view, the top wall of the chamber may be depressed, as indicated at 37, directly above or just rearwardly of the bridge wall 11 and this depressed portion is equipped with a plurality of downwardly directed blast nozzles 37 through which air under pressure is delivered from the transversely extending supply pipe 38. As previously stated, the top blast may be used if desired, but I have found that with my method, the flame is sufficiently controlled and depressed and a high degree of efficiency is obtained without the employment of this blast, which has heretofore been considered indispensable, but has nevertheless been a source of trouble in causing oxidization of metal and interfering with proper control of the relative proportions of fuel and air. The elimination of these troubles is one of the marked advantages resulting from my present invention.

The rear end of the furnace chamber is connected with a properly constructed stack 39 through which the products of combustion are discharged and communication is established between the chamber and this stack preferably immediately above the rear bridge wall 41 through an opening 42 which is proportioned according to size of the furnace and the pressure under which the fuel is delivered by the burner nozzles.

It has heretofore been the practice to employ a large communicating opening between the furnace chamber and the stack and to induce strong draft through this opening. The result has been that an enormous quantity of the heat units of the combustible fuel has been carried from the furnace and delivered to the stack so as to be lost for effective use. By employing a low pressure at the fuel delivery nozzles, the velocity of the flame through the furnace is reduced so that its heat units may be transferred to the charge. This desirable effect is further increased by proportioning the connecting opening 42 to the stack and proportioning the stack itself so that a static pressure is normally maintained in the furnace chamber. This pressure is distinguished from a partial vacuum which has heretofore been maintained in these furnaces, greatly facilitates the transference of the heat units from the burning mixture to the charge and insures a practically complete combustion of the fuel particles before they leave the chamber, with the result that few, if any, unburned fuel particles are wasted through the stack. Obviously, this feature greatly enhances the efficiency of the furnace. By regulation of the feed pressure, this static pressure may be controlled and may be reduced to a balanced draft or even to an appreciable up draft if desired.

It will be obvious from the foregoing that in my improved method, the comminuted, pulverized, atomized, or diffused fuel or fuels, severally or two or more collectively, thoroughly mixed with sufficient air to support complete combustion, is delivered in a turbulent, swirling condition into the furnace in an obliquely downward direction and at low velocity so that ignition and combustion take place close to the delivery nozzle. It should be observed, however, that the ignition and combustion takes place close to the nozzle, irrespective of the angular position at which the nozzle is directed into the furnace, and it is not the purpose to limit or restrict this invention in respect of the various control features to the combination feature of discharge in an angular direction. Indeed, it is obvious that the complete perfect combustion is due to other conditions than the angularity, among these controlling factors being the control of quantity and relative proportions of fuel and air and the delivery of the evenly diffused mixture of the fuel or fuels in a turbulent condition. This is irrespective of the angularity of delivery with reference to the horizontal axis of the furnace. The angular delivery is of special value in certain particular processes and is an added feature of advantage in the present invention, wherein the process or operating conditions make its use advisable. The combustion being speedy results in an intensive heat quickly liberating the gases so that they do not long remain in a nascent condition in which they would readily combine with the bath slag and increase its corrosive effect upon the furnace walls. The fact that all combustion air is evenly diffused with the fuel or fuels and is, therefore, present in intimate contact with the hydro-carbons when first released by the ignition temperature is one of the vital improved features in the present invention. It is well known that a chemical compound immediately after being released from a former existing combination is in a highly active state which is known as "nascent" and, therefore, most susceptible to quick and complete recombination. In this case it is desired to bind the fuel constituents existing as nascent hydrocarbons with the oxygen in chemically balanced proportions, so that the resulting new compounds, that is the combustion gases, are inert and, hence, inactive as to any possible chemical reaction while passing through the furnace in contact with product, walls or heating surfaces. This invention, therefore, establishes two very desirable factors, viz: (1) complete chemically balanced combustion, and (2) inert gases which cannot do damage to product, furnaces, or heating surfaces.

Furthermore, a considerable proportion of the slag resulting from flame formation is immediately deposited in the front pocket beneath the burner so that it does not mingle with the bath slag, and consequently, not only the quantity of bath slag is reduced, but the character of the slag is materially improved. The flame directed against the bath being in a turbulent and swirling condition tends, by reason of its point and direction of delivery into the bath, and by reason of the flat character of the bath floor, to penetrate the charge of loosely piled solid material upon the hearth and to travel along the hearth beneath the charge so as to expedite the melting of the same. When the charge is melted, the flame impinges upon its surface and because of the fact that the bath is shallow, and of substantially uniform depth, it becomes quickly and uniformly heated and reduced to a condition suitable for pouring without prolonged operation of the furnace, as is required where the bath floor is deeply depressed so that the molten metal accumulates in a deep pool. The rapidity of the heating in the furnace is further augmented by the fact that the flame is caused to closely hug the bath throughout its length. This condition is produced not only by the direction, velocity and manner of the fuel delivery into the furnace, but also by the fact that the rear portion of the furnace chamber in which the products of combustion are coolest is of progressively reduced cross sectional area by reason of the downwardly sloping roof, and furthermore by the fact that the rear bridge wall is low and the communicating opening with the stack is also low and is so proportioned as is also the stack, that by regulation of the fuel pressure, a slight static pressure may be maintained in the furnace, which is conducive toward complete combustion of the most effective transference of heat to the charge. My method contemplates the delivery with the pulverized fuel itself of sufficient air to support complete combustion. Consequently, an auxiliary supply of combustion air through the walls of the furnace is unnecessary, and in fact, the delivery of auxiliary cold air into the furnace is not desirable since it tends to reduce the temperature thereof. The top blast may therefore be and preferably is entirely eliminated, but since some types of work seem to be slightly more effectively performed by additionally depressing the flame through the instrumentality of a top blast, I have illustrated the application of a top blast to the furnace herein shown.

By the practice of the method above disclosed, I am not only able to reduce the fuel consumption and to expedite the melting, heating and pouring of the charge, but also to employ in the composition of the charge a considerably greater proportion of scrap iron than has heretofore been possible in the production of metal of a predetermined character and composition. This feature is manifestly of significant importance since the proportion of pig iron required may be diminished, thereby decreasing the cost of the furnace charge. In practice, I have found that with my novel method, I am able to utilize, instead of over 60% expensive pig iron, high in silicon and manganese to 40% of scrap which is low in silicon and manganese, as has heretofore been customary, considerably more scrap than pig iron in a charge, and still obtain a resultant malleable iron of superior quality containing the requisite predetermined proportions of silicon, manganese, carbon and sulphur manganese.

Should a test of the molten metal show it to be too low in one ingredient, the flame may be regulated to hold the molten mass in status quo with respect to the other ingredients while the requisite quantity of the low ingredient is added to the charge to produce the desired analysis. My invention therefore, affords a wide range of flexibility in its operation and the results which may be secured thereby.

Furthermore, by reason of the elimination from the bath of a large portion of the slag and by improving the character of the bath slag, as the result of improved gas conditions in the furnace, the deterioration of the brick work of the furnace is materially decreased, and the cost of repairs is proportionately diminished, as well as rendering the furnace serviceable for prolonged periods of time.

It is believed that my invention, and many of its inherent advantages, will be understood and appreciated from the foregoing without further description, and while I have shown and described a preferred method and means for carrying it into effect, obviously, both the method and apparatus may be varied within considerable limits without departing from the scope of the invention as defined in the following claims.

I claim:

1. In a furnace, the combination of a heating chamber provided with a hearth, said hearth being substantially level from end to end, arched slightly upwardly in cross section and adapted to contain a shallow bath, and means for delivering a combustible mixture of comminuted fuel and air to said chamber.

2. In a furnace, the combination of a heating chamber, comprising a hearth substantially level from end to end providing a relatively shallow bath, an outlet stack communicating with said chamber, and a rear bridge wall between said bath and said stack, the communicating opening between said chamber and stack being so proportioned with relation to the stack and the feed pressure as to maintain a static pressure in said chamber.

3. In a furnace, the combination of a heating chamber, comprising a hearth substantially level from end to end, an outlet stack communicating with said chamber, and a rear bridge wall between said bath and said stack, the communicating opening between said chamber and stack being so proportioned with relation to the stack and the feed pressure as to maintain a static pressure in said chamber.

4. In a furnace, the combination of a heating chamber, comprising a hearth substantially level from end to end, and adapted to receive a charge to be heated, an outlet stack communicating with said chamber, and a rear bridge wall between said bath and said stack, the communicating opening between said chamber and stack being so proportioned with relation to the stack and the feed pressure as to maintain a static pressure in said chamber.

5. In a furnace, the combination of a heating chamber, comprising a hearth providing a shallow bath, an outlet stack and a rear wall between said chamber and stack provided with a restricted opening adapted to maintain a static pressure in said chamber.

6. In a furnace, the combination of a heating chamber, including a hearth, means for feeding a mixture of air and fuel into said chamber, an outlet stack, and a rear wall between said chamber and stack provided with a restricted opening adapted to maintain a static pressure in said chamber.

7. In a furnace, the combination of a heating chamber, an outlet stack communicating with said chamber, and an opening between said chamber and stack so proportioned as to maintain a static pressure in the said chamber.

8. In a furnace, the combination of a heating chamber, means for feeding a mixture of air and fuel into said chamber, an outlet stack communicating with said chamber, and an opening between said chamber and stack so proportioned as to maintain a static pressure in the said chamber.

9. In a furnace, the combination of a heating chamber, means for feeding a mixture of air and fuel into said chamber, means for controlling the fuel and air fed, an outlet stack communicating with said chamber, and an opening between said chamber and stack so proportioned as to maintain a static pressure in the said chamber.

10. A furnace, comprising a chamber having front and rear walls, a hearth, a bridge wall spaced from said front wall, a floor inclined upwardly from said bridge wall toward said front wall and provided adjacent the front wall with a pocket, and means for delivering a mixture of air and comminuted fuel to said chamber directly over said pocket.

11. In a furnace, the combination with a chamber provided with a hearth and a floor sloping upwardly and forwardly of said hearth, of means for delivering to said chamber at low velocity a mixture of comminuted fuel and air in a turbulent condition, and a pocket in said floor immediately beneath the point of entrance of the mixture into the chamber adapted to receive the slag produced at the point of flame formation in said mixture.

12. In a furnace, the combination of a chamber comprising front and rear walls, a hearth, means for maintaining a static pressure in the chamber, means for supplying to said chamber in turbulent condition a mixture of comminuted fuel and air, means for varying the direction of discharge to said mixture into said chamber, and a slag pocket disposed adjacent to and beneath the point of entrance of said mixture into the chamber.

13. The herein described method, which consists in delivering to a furnace containing a charge of material to be treated, a supply of pulverized fuel thoroughly mixed with sufficient air to support complete combustion, causing the delivery of such fuel in a turbulent condition and in a downwardly inclined direction, separating a portion of the slag resulting from flame formation and collecting the same at a point remote from the bath, causing the flame to hug the bath, and maintaining a static pressure in the heating chamber of the furnace.

14. The herein described method, which consists in delivering to a furnace a supply of fuel thoroughly mixed with sufficient air to support complete combustion, said fuel being atomized and diffused and delivered in a turbulent condition, separating a portion of the slag resulting from combustion at the place of flame formation and maintaining a static pressure in the heating chamber of the furnace.

15. The herein described method, which consists in delivering to a furnace a supply of fuel thoroughly mixed with sufficient air to support complete combustion, said fuel being atomized and diffused and delivered in a turbulent condition at low velocity, separating a portion of the slag resulting from combustion at the point of flame formation and maintaining a static pressure in the heating chamber of the furnace.

16. The herein described method, which consists in delivering to a furnace a supply of fuel thoroughly mixed with sufficient air to support complete combustion, said fuel being atomized and diffused and delivered in a turbulent condition with controlled velocity, separating a portion of the slag resulting from combustion at the point of flame formation and maintaining a static pressure in the heating chamber of the furnace.

17. The herein described method which consists in delivering to a furnace controlled total quantities and controlled relative proportions of air and fuel in a mixture, the said fuel being atomized and diffused and in free suspension, said mixture being in a turbulent condition with controlled velocity, separating a portion of the slag resulting from combustion at or near the point of flame formation in the said mixture, and maintaining and controlling a static pressure in the heating chamber.

18. The herein described method, which consists in delivering in turbulent condition to a chamber containing a charge of material to be treated, a supply of pulverized combustible material at low velocity thoroughly mixed with sufficient air to support combustion, causing the flame from said combustible material to travel in proximity to the bottom of the charge, and regulating the pressure within said chamber.

19. The herein described method, which consists in delivering in turbulent condition to a furnace chamber, a supply of pulverized combustible material at low velocity thoroughly mixed with sufficient air to support combustion, and regulating the pressure within said chamber.

20. The herein described method, which consists in delivering in turbulent condition to a furnace chamber, a supply of pulverized combustible material thoroughly mixed with sufficient air to support combustion and regulating the static pressure within said chamber.

21. The herein described method, which consists in delivering controlled quantities and controlled relative proportions of fuel in a turbulent condition to a furnace chamber, said fuel being in free suspension at low velocity, the said fuel being thoroughly mixed with sufficient air to support combustion, and regulating the static pressure within said chamber.

22. The herein described method which consists in producing a malleable metal of predetermined composition by charging a furnace with pig iron and scrap, the quantity of scrap being in excess of the pig iron, and reducing the charge to malleable iron of a predetermined composition by subjecting the charge to a flame of such quality and intensity as will reduce the charge without losing an appreciable portion of the silicon and manganese contained in the charge.

23. The herein described method which consists in producing a malleable metal of predetermined composition by charging a furnace with pig iron and scrap, the quantity of scrap being in excess of the pig iron, and reducing the charge to malleable iron of a predetermined composition by subjecting the charge to a flame of such quality and intensity as will reduce the charge and at the same time maintain control of the carbon, silicon and manganese contained in the charge.

24. The herein described method which consists in producing a malleable metal of predetermined composition by charging a furnace with pig iron and scrap, the quantity of scrap being in excess of the pig iron, and reducing the charge to malleable iron of a predetermined composition by subjecting the charge to a flame of such quality and intensity as will reduce the charge without so altering the content of carbon, silicon and manganese and other ingredients, as to impair the quality of the malleable iron produced.

25. The herein described method which consist in producing a malleable metal of predetermined composition by charging a furnace with pig iron and scrap, the quantity of scrap being in excess of the pig iron, and reducing the charge to malleable iron of a predetermined composition by subjecting the charge to a flame of such quality and intensity as will reduce the charge without losing such portion of the carbon, silicon, manganese, and other ingredients contained in the charge as will impair the quality of the finished product.

26. The method which consists in depositing in a furnace a charge of metal consisting of less than 50% pig iron and more than 50% scrap iron and subjecting said charge to the action of a flame of such quality and intensity as will reduce the charge without appreciable loss of silicon and manganese thereby producing a high grade malleable iron.

27. The method of treating metals which consists in subjecting a charge of metal in a furnace to the action of a burning turbulent mixture of pulverized fuel and air delivered at low velocity, and controlling the relative proportions of fuel and air so as to produce a flame which will have the desired effect upon the charge.

28. The method of treating metals which consists in subjecting a charge of metal in a furnace to the action of a burning turbulent mixture of pulverized fuel and air delivered at low velocity, controlling the velocity of the mixture delivered, and controlling the relative proportions of fuel and air so as to produce a flame which will have the desired effect upon the charge.

29. The method of treating metals, which consists in subjecting a charge of metal in a furnace to the action of a burning turbulent mixture of pulverized fuel and air delivered at low velocity, and controlling the quantity and relative proportions of fuel and air so as to produce a flame which will have the desired effect upon the charge.

30. The method of treating metals, which consists in subjecting a charge of metal in a furnace to the action of a burning turbulent mixture of pulverized fuel and air delivered at low velocity, controlling the velocity of the mixture delivered, and controlling the quantity and relative proportions of fuel and air so as to produce a flame which will have the desired effect upon the charge.

31. The method of treating metals, which consists in subjecting a charge of metal in a furnace to the action of a burning turbulent mixture of pulverized fuel and air delivered at low velocity, regulating the relative proportions of fuel and air and maintaining a static pressure in the furnace.

32. The method of firing which consists in delivering to a furnace a burning turbulent mixture or mixtures of fuel and air, said fuel being diffused in air, said fuel being delivered at low velocity, regulating the relative proportions of fuel and air and maintaining a static pressure in the furnace.

33. The method of treating metals, which consists in subjecting a charge of metal in a furnace to the action of a burning turbulent mixture of pulverized fuel and air, and regulating the static pressure in the furnace.

34. The method of treating metals, which consists in subjecting a charge of metal in a furnace to the action of a burning turbulent mixture of pulverized fuel and air, and regulating the proportions of fuel and air to thereby produce an oxidizing, a reducing or a neutral flame at will.

35. The method of treating metals, which consists in subjecting a charge of metal in a furnace to the action of a burning turbulent mixture of pulverized fuel and air, and regulating the flame to cause the production in the metal when poured of the requisite proportions of carbon, silicon, manganese and sulphur.

36. The method which consists in delivering to a furnace a burning turbulent mixture of pulverized fuel and air and regulating the flame both as to intensity and chemical composition of the gases so as to control the chemical reaction of the gases on any heating surfaces that may be exposed to the action of the gases in the furnace.

37. The method of treating metals, which consists in subjecting a charge of metal in a furnace to the action of a burning turbulent mixture of pulverized fuel and air, and regulating the flame to cause the production of the requisite proportions of the various ingredients in the finished batch.

38. The method which consists in placing a charge of material in the furnace and subjecting it to the action of a burning turbulent mixture of pulverized fuel and air and regulating the flame both as to intensity and chemical composition of its constituent gases so as to have the desired chemical effect on the material being treated.

39. The combination with a heating chamber provided with a hearth constructed to contain a shallow bath, of means for delivering at relatively low velocity to said chamber a swirling turbulent combustible mixture comprising air with fuel uniformly diffused therethrough.

40. The combination with a heating chamber provided with a hearth constructed to contain a shallow bath, of means for delivering at relatively low velocity to said chamber a swirling turbulent combustible mixture comprising air with fuel uniformly diffused therethrough and means including an adjustable damper for controlling the delivery of said mixture.

41. The herein disclosed method comprising, producing outside a combustion chamber a combustible mixture of fuel uniformly diffused throughout sufficient air to support complete combustion of said fuel, delivering said mixture in a turbulent condition at low velocity to the combustion chamber, and regulating the combustion of said mixture within a range including oxidizing and reducing frames.

In witness of the foregoing I affix my signature.

MILTON W. ARROWOOD.